United States Patent Office 3,398,347
Patented Aug. 20, 1968

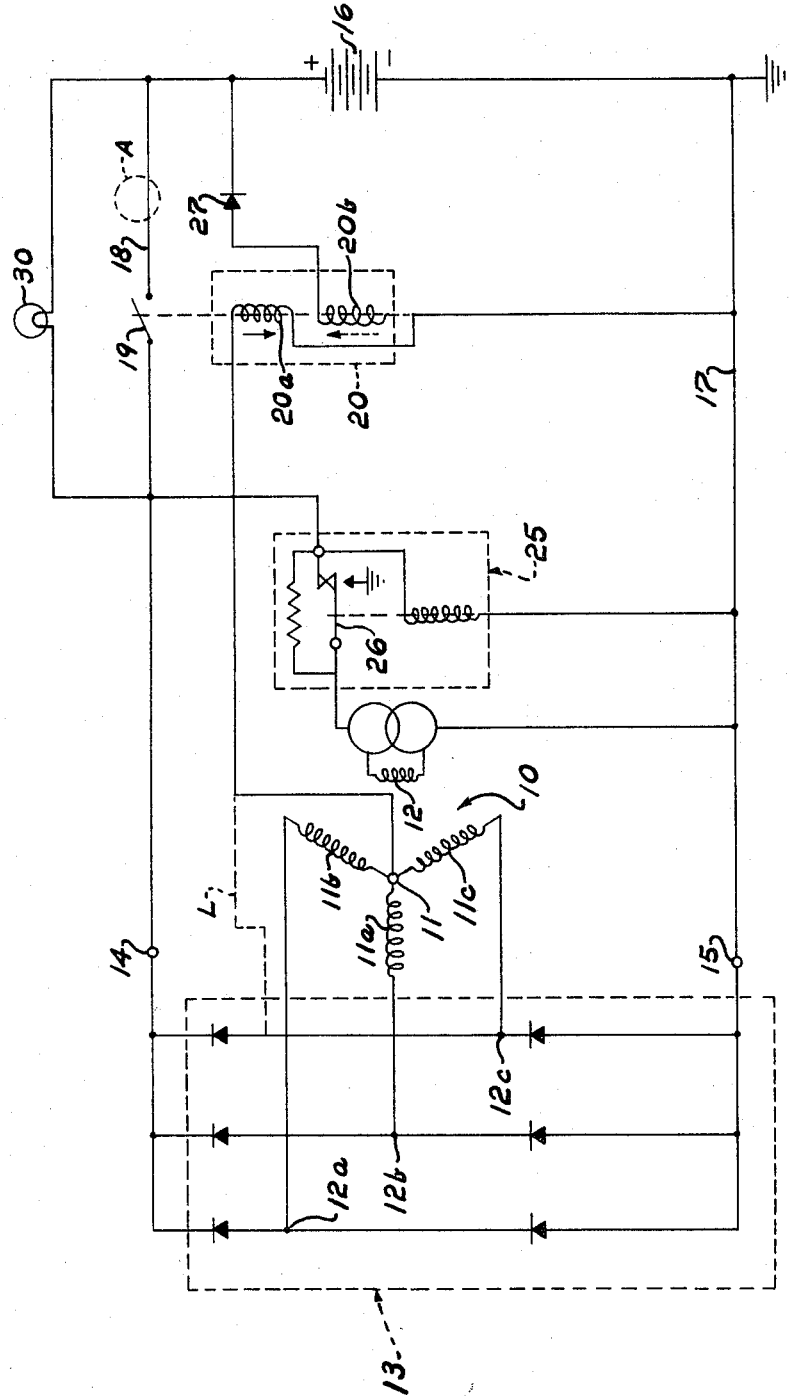

3,398,347
LOAD CIRCUIT CONTROL FOR
GENERATING SYSTEM
Angelo M. Citro, Chagrin Falls, Ohio, assignor to The
Leece-Neville Company, Cleveland, Ohio, a corporation of Ohio
Filed Apr. 29, 1966, Ser. No. 546,325
6 Claims. (Cl. 320—25)

ABSTRACT OF THE DISCLOSURE

This system has an alternator-rectifier unit for producing a unidirectional output voltage to energize a load which includes a vehicle battery. The contacts of a two-coil load relay are connected between the output of the alternator-rectifier unit and the load. A first coil of this relay, which is connected solely to be energized in accordance with the output of the alternator-rectifier unit, will close the load relay contacts when this output reaches a predetermined value. A blocking diode is connected between the second coil and one of the battery terminals to prevent energization of the second coil when the battery polarity is correct. However, when the battery polarity is reversed, this diode will pass current to the second coil, energizing the latter to prevent the first coil from closing the load relay contacts.

The present invention relates to an electrical generating system and more particularly to a vehicle electrical generating system including an alternator-rectifier unit and a load relay for connecting the alternator-rectifier unit to a direct current load circuit including a battery.

In certain types of systems including batteries, particularly electrical systems for vehicles in which an alternator-rectifier unit is to be connected to a load circuit including a battery, it is desirable to protect the electrical system against the battery being connected into the load circuit of the machine with reversed polarity, as well as to provide means for effecting the connection of the generating machine to the battery and load circuit when its output voltage is at a predetermined level and to disconnect it from the battery and load circuit when its output voltage drops to or below the battery voltage. Load relays are commonly used to connect and disconnect a generating machine to a load circuit including a battery and it is desirable that the load relay and circuit be such that the relay under the normal conditions of operation need not break load currents. Moreover, a load relay is often desirable because it disconnects the battery from the generating machine on shutdown to remove battery potential from the output terminal of the machine.

The principal object of the present invention is to provide a new and improved electric system, particularly for a motor vehicle, having a load relay for connecting a generating machine, such as an alternator-rectifier unit, across a load circuit including a battery and in which the load relay has a novel circuit connection to one of the battery terminals in the load circuit to protect the electrical system when the battery is placed into the system with reversed polarity.

Another object of the present invention is to provide a novel and improved vehicle electrical generating system which operates to protect against a reversely connected battery entirely independent of the ignition switch for the vehicle engine, so that the present system is particularly advantageous for use with diesel engines, as well as gasoline engines.

Another object of the present invention is to provide a new and improved vehicle electrical generating system as in the preceding objects which is compatible with a charge indicator light or an ammeter.

Another object of the present invention is to provide a new and improved electrical generating system including a generating machine, preferably an alternator-rectifier unit, and a load circuit including a battery, in which a load relay has a set of contacts connected between the output of the generating machine and the load circuit, the load relay having a first coil connected to be energized in accordance with the output voltage of the generating machine to close these contacts and having a second coil connected through a blocking diode to the battery so as to be energized by battery current to prevent the first coil from closing the aforementioned contacts when the battery is connected with reversed polarity, but to be blocked from the battery and permitting the first coil to close these contacts when the battery is connected with the correct polarity.

Further objects and advantages of the present invention will be apparent from the following detailed description of the preferred embodiment thereof made with reference to the accompanying drawing forming a part of the present specification for all matter disclosed therein and in which the sole figure is a circuit diagram of an electrical generating system embodying the present invention.

Referring to the drawing, the electrical generating system shown therein includes an alternator 10 having a three-phase armature winding 11 on the stator and a field winding 12 on the rotor of the machine. The phase windings of the armature are designated by the reference numerals 11a, 11b, 11c and these phase windings are connected to input terminals 12a, 12b, and 12c of a full wave rectifier 13 having output terminals 14 and 15. The output terminal 15 is connected to a negative load conductor 17, which may be grounded, while the output terminal 14 is connected to a positive load conductor 18 through contacts 19 of a load relay 20. The relay contacts 19 are normally open and are closed when the alternator-rectifier unit comes up to voltage, as will be described in more detail hereinafter, to connect the alternator-rectifier unit across the load conductors 17, 18 and, in turn, across the battery 16.

The load relay 20 has first and second voltage coils 20a, 20b for controlling the actuation of the contacts 19. The first coil 20a is connected between the neutral point of the three-phase winding 11 and the output terminal 15 of the rectifier. Consequently, the coil 20a is energized independently of the condition of the contacts 19, and the voltage across the coil 20a will be a function of the rectified output voltage of the alternator. Alternatively the coil 20a may be connected to an input terminal of the rectifier 13 as indicated by the dashed line L in the drawing. Either connection will cause the coil 20a to be energized with pulsating unidirectional current which flows through one part of the rectifier 13. Coil 20a alone is effective to move the relay contacts 19 from open to closed position, as indicated by the downwardly-pointing arrow next to coil 20a in the drawing, when the voltage developed by the alternator is at or somewhat below its full operating voltage, and it holds the relay contacts closed until the voltage developed by the alternator has dropped to substantially zero.

The second coil 20b preferably is wound on the outside of the first coil and, in accordance with the present invention, it is arranged to prevent the first coil 20a from closing the relay contacts 19 if the polarity of the battery 16 is reversed from the proper polarity, but not to prevent the first coil 20a from closing contacts 19 if the battery is connected with the correct polarity. The drawing shows battery 16 connected in the system with proper polarity. In accordance with the present invention, the upper end of the second coil 20b is connected to the battery 16 through a blocking diode 27 which acts as a unidirectional conducting means in the circuit. The lower ends of both relay coils 20a and 20b are connected to the grounded negative load conductor 17.

With this arrangement, if the battery 16 is properly connected across the load conductors 18 and 17, as shown, the polarity of the blocking diode 27 is such that it blocks the second relay coil 20b from the battery and no battery current flows through coil 20b. Under these conditions, coil 20b is not energized and has no effect on the operation of the relay contacts 19, which now will be entirely under the control of the first relay coil 20a, as described.

However, if the battery 16 is connected across the load conductors 18 and 17 with its polarity reversed (that is, with its negative terminal at the top in the drawing), then current will flow from the battery through the blocking diode 27 and the second relay coil 20b. When the second relay coil 20b is thus energized, it opposes the action of the first coil 20a, as indicated by the upwardly-pointing dashed-line arrow next to coil 20b in the drawing. Consequently, the second relay coil 20b will, with the battery polarity reversed, prevent the first-relay coil 20a from pulling in the relay contacts 19, even after the alternator has developed its full operating voltage.

As is understood by those experienced in this art, it is important that an alternator-rectifier unit be protected against a reverse polarity connection of the battery in the system since the rectifier would be a short circuit across the battery and the resulting current could destroy the rectifier or the wiring of the generating system.

It will be noted that this operation of the second relay coil 20b takes place entirely independent of the ignition switch (not shown) for the vehicle engine. That is, the present control arrangement functions to protect the system from the adverse effects of a reversed battery polarity without depending upon the presence of ignition switch contacts in the control arrangement itself. This makes the present control arrangement particularly advantageous for use on diesel engine vehicles, as well as on gasoline engine vehicles.

In normal operation (i.e., with the proper battery polarity), after the starting of the engine driving the alternator 10, the alternator voltage will build up and when the generated voltage has come up to a desired voltage the current through the first coil 20a will cause the relay contacts 19 to close. Preferably the load relay closes at or below battery voltage. In the illustrated embodiment, the output of the alternator is shown as being regulated between maximum and minimum voltage levels by a conventional vibrating contact type regulator 25 having a voltage coil connected across the output terminals 14, 15 of the alternator-rectifier unit and vibrating contacts 26 for connecting the field of the alternator to the output terminal 14.

Conventionally the dropout voltage of a relay is below the pull-in voltage. In the preferred embodiment the dropout voltage of the relay 20 and the effect of the first coil 20a is such that coil 20a will hold in the relay contacts 19 until the energizing voltage for coil 20a drops to a value which indicates substantially no output from the alternator system. Consequently, the load relay is not required to break load currents, thereby preventing damage to the contacts 19.

The disclosed circuit is fully compatible with the use of either an ammeter or an indicator light when the system is a vehicle-generating system. As shown in the drawing, an indicating lamp, designated by the reference numeral 30, may be connected across the relay contacts 19. The lamp will be lighted when the contacts 19 are open to indicate that there is no output from the alternator-rectifier unit. When the battery 16 is connected in the load circuit with the proper polarity, the current for energizing the lamp flows from the battery 16, through the lamp 30 and through the contacts 26 of the voltage regulator 25, which will be closed when a low voltage exists across the terminals 14, 15, and through the field winding 12 of the alternator. This current for energizing the lamp also provides a bleed current for energizing the alternator field to aid the alternator to come up to voltage. The resistance of lamp 30 is sufficiently high to prevent excessive battery current through the rectifier of the alternator-rectifier unit 13 when the battery 16 is connected in the load circuit with reversed polariy.

In the event that the alternator should fail after operation is started, the voltage of the alternator will drop and the loss of energization for the first coil 20a will cause the load relay contacts 19 to open and the lamp 30 to be lighted, thereby indicating the failure of the alternator as well as protecting the system, including the diodes of rectifier 13, when the alternator fails.

If an ammeter is to be used in lieu of an indicator lamp the ammeter A may be placed in series with the relay contacts 19 between the output terminal 14 of the rectifier and the upper terminal of battery 16, as indicated in dashed lines in the drawing.

From the foregoing it can now be seen that the present invention provides a new and improved electrical system in which a load relay protects the system against a reversed battery, operates to disconnect the load system from the alternator without breaking substantial load current under normal operating procedure, and is compatible with both an indicator lamp and an ammeter-type charge indicator.

While the preferred embodiment of the present invention has been described in considerable detail, it will be understood by those skilled in the art that future modifications, constructions and arrangements may be made which fall within the spirit and scope of the present invention.

I claim:

1. An electrical generating system comprising a voltage generating machine having a unidirectional output for connection to an external direct current load circuit including a battery, a load relay having normally-open contacts connected between the output of said machine and said load circuit, said load relay having first and second coils jointly controlling said contacts, said first coil being connected to said machine to be energized by the latter independently of the condition of said contacts and independently of the energization of said second coil with a voltage dependent upon the output voltage of said machine, said first coil being operable to close said contacts when the output voltage of said machine reaches a predetermined value, said load relay having a second coil operable when energized by current in one direction to oppose the contact-closing action of said first coil, and circuit means independent of the machine output connecting said second coil to the battery to pass battery current in said one direction to said second coil to pass battery current to said second coil of a polarity effective to prevent the first coil from closing said contacts when the battery is connected in the load circuit with reversed polarity, said circuit means blocking battery current from the second coil when the battery is connected in the load circuit with the proper polarity.

2. A system according to claim 1 wherein said circuit means includes a blocking diode connected between the second coil and the battery, said blocking diode having a polarity such that it passes battery current in said one direction to the second coil when the battery is connected in the load circuit with reversed polarity and blocks battery current from the second coil when the battery is connected in the load circuit with the correct polarity.

3. A system according to claim 1 wherein said circuit means connecting the second coil to the battery does not include contacts of an ignition switch for an engine in the load circuit.

4. An electrical generating system for a vehicle comprising an alternator-rectifier unit, positive and negative load conductors connected across said alternator-rectifier unit, a load relay having normally-open contacts connected between the output of said alternator-rectifier unit and one of said load conductors, said load relay having first and second coils jointly controlling said contacts, said first coil being connected to said alternator-rectifier unit for energization by the latter independently of the condition of said contacts and independently of the energization of said second coil with a voltage dependent solely upon the output voltage of said alternator-rectifier unit, said first coil being operable to close said contacts when the output voltage of said alternator-rectifier unit reaches a predetermined value, said load relay having a second coil operable when energized by current in one direction to oppose the contact-closing action of said first coil, and unidirectional conducting means connecting said second coil to one of said load conductors to supply battery current in said one direction to the second coil to energize the latter so as to prevent the first coil from closing said contacts when a battery is connected across said load conductors with reversed polarity, said unidirectional conducting means blocking battery current from said second coil when the battery is connected across said load conductors with the correct polarity.

5. An electrical generating system according to claim 4, wherein said unidirectional conducting means is a blocking diode.

6. An electrical generating system according to claim 4, wherein the other of said load conductors is grounded, said first coil has one end thereof connected to said alternator-rectifier unit and its opposite end connected to said grounded load conductor, and said second coil has one end thereof connected to said one load conductor through said unidirectional conducting means and its opposite end connected to said grounded load conductor.

References Cited

UNITED STATES PATENTS

| 3,363,167 | 1/1968 | Szabo et al. | 322—8 |
| 3,062,998 | 11/1962 | Medlar | 320—25 X |
| 3,129,373 | 4/1964 | Godshalk et al. | 320—25 |
| 3,308,365 | 3/1967 | St. John | 320—25 |

LEE T. HIX, *Primary Examiner.*

S. M. WEINBERG, *Assistant Examiner.*

UNITED STATES PATENT OFFICE
CERTIFICATE OF CORRECTION

Patent No. 3,398,347　　　　　　　　　　　　　　August 20, 1968

Angelo M. Citro

It is certified that error appears in the above identified patent and that said Letters Patent are hereby corrected as shown below:

Column 4, line 54, cancel "to pass battery current to said second coil".

Signed and sealed this 20th day of January 1970.

(SEAL)
Attest:

Edward M. Fletcher, Jr.　　　　　　　　　　　WILLIAM E. SCHUYLER, JR
Attesting Officer　　　　　　　　　　　　　　　　Commissioner of Patents